United States Patent [19]

Hijikata et al.

[11] Patent Number: 5,535,221
[45] Date of Patent: Jul. 9, 1996

[54] FRAME LENGTH CONTROL IN DATA TRANSMISSION USING ATM NETWORK

[75] Inventors: Toshiyuki Hijikata; Tetsuo Tachibana, both of Kawasaki, Japan

[73] Assignee: Fujitsu Limited, Kawasaki, Japan

[21] Appl. No.: 928,709

[22] Filed: Aug. 13, 1992

[30] Foreign Application Priority Data

Aug. 15, 1991 [JP] Japan .................. 3-204515

[51] Int. Cl.⁶ .................................. H04J 3/16
[52] U.S. Cl. .................. 371/5.5; 370/82; 370/60
[58] Field of Search ............ 371/5.5, 363, 362; 340/825.89; 370/82, 60, 13, 14, 17, 85.4

[56] References Cited

U.S. PATENT DOCUMENTS

| | | | |
|---|---|---|---|
| 4,947,388 | 8/1990 | Kuwahara et al. | 370/60 |
| 5,124,978 | 6/1992 | Chao | 370/60 |
| 5,130,978 | 7/1992 | Mobasser | 370/60 |
| 5,163,046 | 11/1992 | Hahne et al. | 370/79 |
| 5,214,642 | 5/1993 | Kunimoto et al. | 370/82 |
| 5,253,247 | 10/1993 | Hirose et al. | 370/14 |
| 5,258,752 | 11/1993 | Fukaya et al. | 340/825.89 |
| 5,267,232 | 11/1993 | Katsube et al. | 370/17 |
| 5,274,680 | 12/1993 | Sonton et al. | 375/118 |
| 5,311,509 | 5/1994 | Heddes et al. | 370/82 |
| 5,311,513 | 5/1994 | Ahmadi et al. | 370/85.4 |
| 5,313,454 | 5/1994 | Bustini et al. | 370/13 |

FOREIGN PATENT DOCUMENTS

| | | |
|---|---|---|
| 0254047 | 1/1988 | European Pat. Off. . |
| 0269202 | 6/1988 | European Pat. Off. . |
| 0355797 | 2/1990 | European Pat. Off. . |
| 0430571 | 6/1991 | European Pat. Off. . |
| 2-151152 | 6/1990 | Japan . |

*Primary Examiner*—Emanuel T. Voeltz
*Assistant Examiner*—Patrick J. Assouad
*Attorney, Agent, or Firm*—Staas & Halsey

[57] ABSTRACT

A length of an I field of an I frame in the data link layer is controlled in accordance with a rate of cells lost in an ATM layer. The loss rate of cells is calculated by watching sequence numbers included in the cells in an ATM adaptation layer.

8 Claims, 10 Drawing Sheets

Fig. 2C
I FRAME

Fig. 2D

SAR PDU

Fig. 2E

ATM CELL

| LENGTH DATA | I FIELD LENGTH (BYTES) |
|---|---|
| 0 0 0 | 1K |
| 0 0 1 | 2K |
| 0 1 0 | 4K |
| 0 1 1 | 8K |
| 1 0 0 | 16K |
| 1 0 1 | 32K |
| 1 1 0 | 64K |
| 1 1 1 | 128K |

0 : LENGTH DATA
1 : INFORMATION

FRAME LENGTH CONTROL IN DATA TRANSMISSION USING ATM NETWORK

BACKGROUND OF THE INVENTION

1. Field of the Invention

The present invention relates to a method and an apparatus for controlling a length of information frames assembled to perform error recovery control in data transmission that is realized using an ATM (Asynchronous Transfer Mode) network.

2. Description of the Related Art

The ATM network provides various types of services having various traffic characteristics in various transmission speeds from high speed to low speed, by segmentating transmission data into cells having a fixed 53 bytes length and by statistically multiplexing the cells. When a congestion of cells occurs because of an increase in traffic in the ATM network, cells can be lost, because the ATM layer does not provide an error recovery procedure. Therefore, to securely transmit burst digital data, an error recovery control should be provided in a data link layer higher than the ATM layer.

Conventional data link protocols such as an LAPB (link access protocol balanced) may be used to perform the error recovery control, wherein the transmission data are segmentated into frames including error detection codes and the frames are retransmitted if frames are not received in a receiver side or if errors are detected in received frames.

If the frames are short, a process for error detection is frequently carried out, and therefore, transmission efficiency is lowered, but, if the frames are long, the error detection process is not frequently carried out. However, as the traffic in the ATM network increases, the congestion of cells frequently occurs. Then, if the frames are long, the rate of received frames including errors increases, so that retransmission frequently occurs, and consequently, transmission efficiency is lowered.

SUMMARY OF THE INVENTION

It is an object of the present invention to provide a method and apparatus for adaptively controlling a length of frames in accordance with the congestion condition of cells in an ATM network.

In accordance with the present invention, there is provided a method of controlling a length of information frames in a data transmission where transmitted data are divided into information frames in a first layer of a hierarical reference model where error recovery control is attained and the information frames are further divided into cells in a second layer lower than the first layer in order to be transmitted on an asynchronous transfer mode network, comprising the steps of detecting a rate of cells lost in the transmission on the asynchronous transfer mode network, in the second layer, determining a length in accordance with the rate detected in the detecting step, in the first layer, and using the length determined in the determining step as the length of the information frames in the first layer.

In accordance with the present invention there is also provided an apparatus for controlling the length of information frames in a data transmission where transmitted data are divided into the information frames in a first layer of a hierarical reference model where error recovery control is attained and information frames are further divided into cells in a second layer lower than the first layer in order to be transmitted on an asynchronous transfer mode network, comprising means for detecting a rate of cells lost in the transmission on the asynchronous transfer mode network, in the second layer, means for determining a length in accordance with the rate detected by the detecting means, in the first layer, and means for using the length determined by the determining means as the length of the information frames in the first layer.

DESCRIPTION OF THE PREFERRED EMBODIMENTS

Before describing the preferred embodiments according to the present invention, examples of the related art are given with reference to the accompanying drawings.

Figure 1:
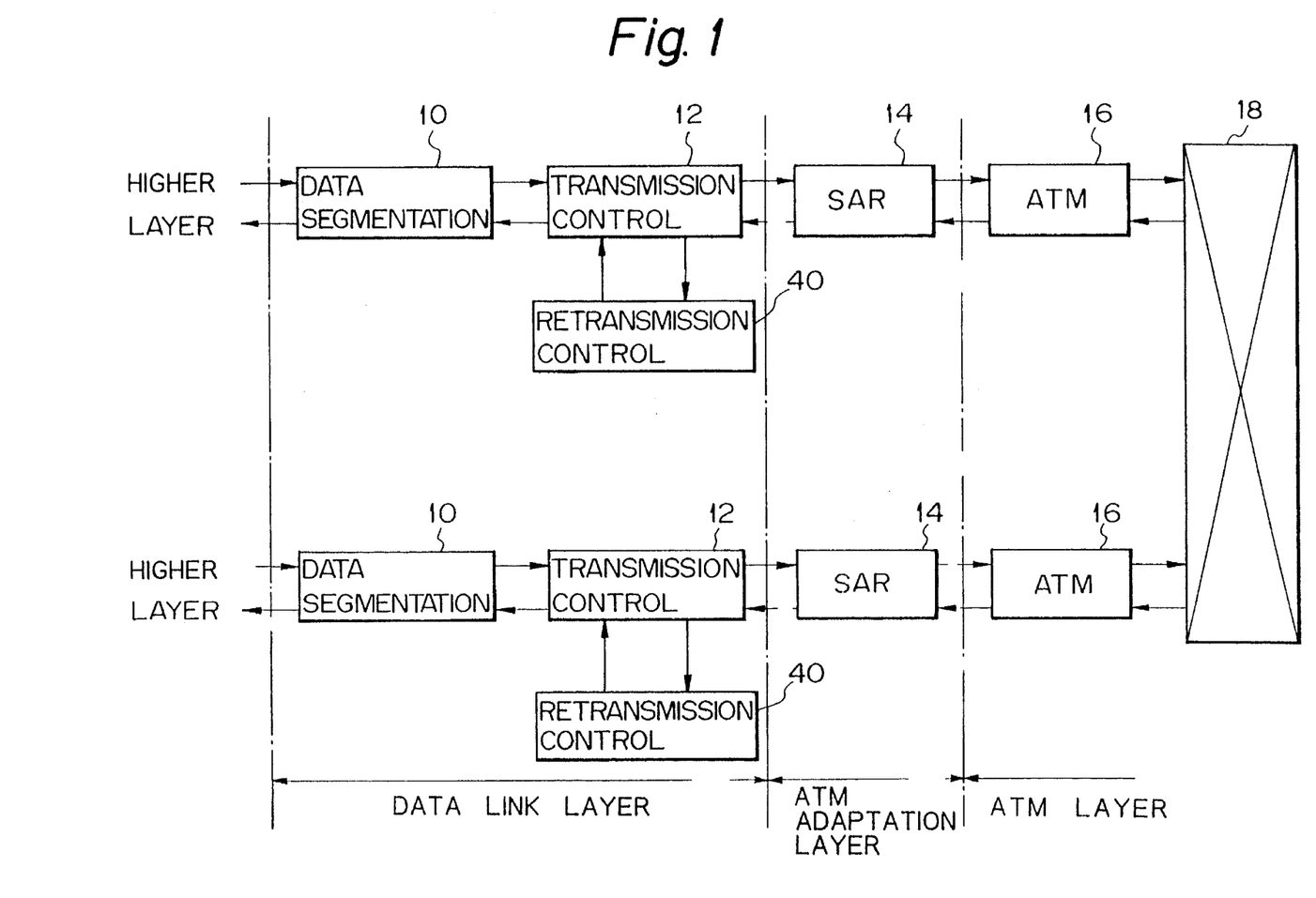
FIG. 1 is a block diagram showing an example of a transmission system wherein retransmission control is carried out in a layer higher than an ATM layer.

FIG. 1 shows an example of a transmission system wherein,retransmission control is carried out in a layer higher than an ATM layer, and FIGS. 2A to 2E show formats of data transmitted between units shown in FIG. 1.

Figure 2A:
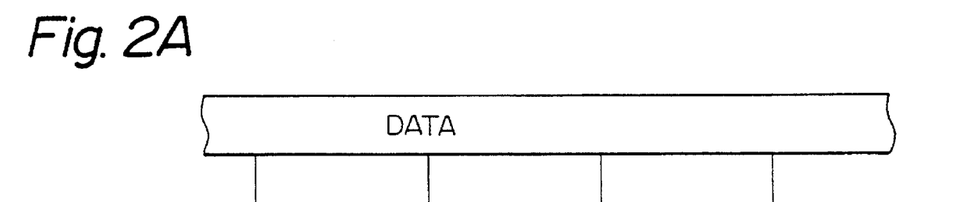
FIGS. 2A to 2E are diagrams showing formats of data transmitted between units shown in FIG. 1.
Figure 2B:
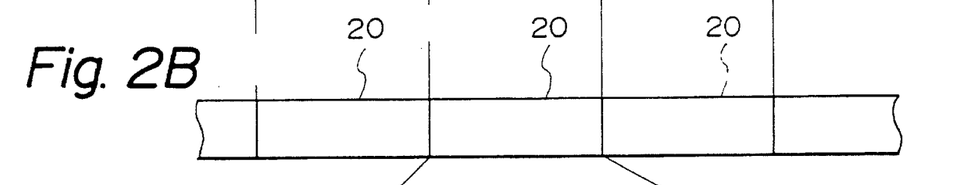
Figure 2C:
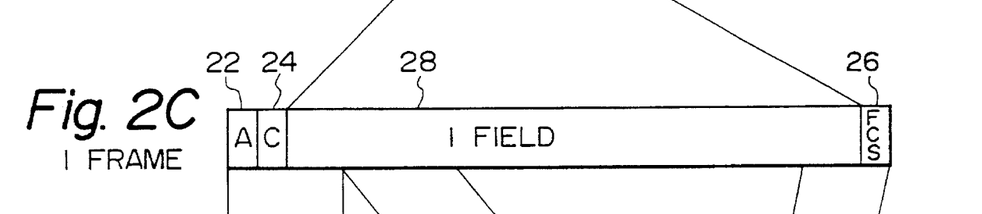
Figure 2D:
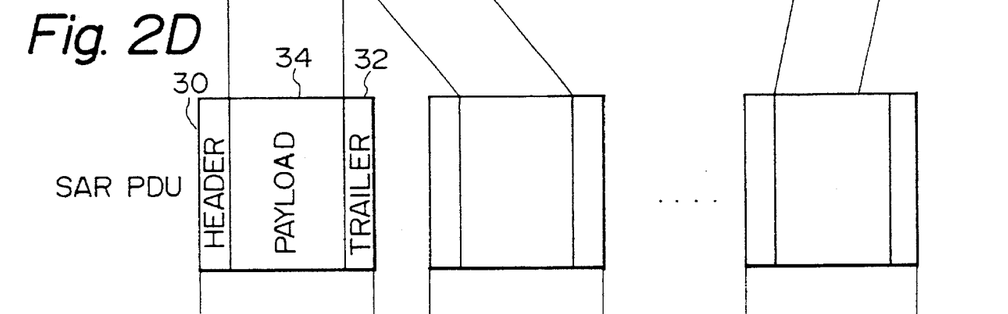
Figure 2E:
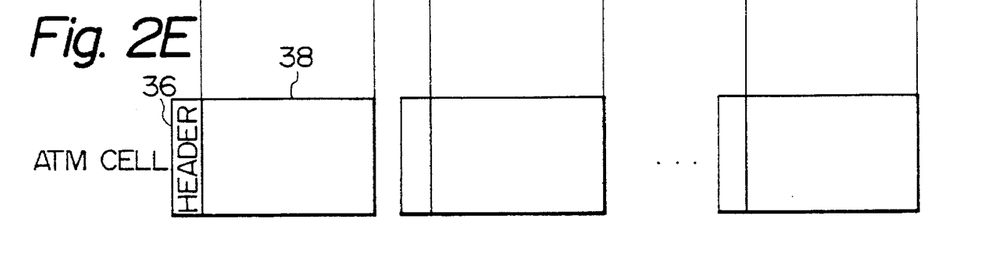

In a transmitted data flow, shown by arrows indicating a direction to the right in FIG. 1, a data segmentation unit 10 divides data of FIG. 2A, received from a higher layer, into segments 20 having a prescribed length as shown in FIG. 2B. A transmission control unit 12 assembles an I (information) frame by adding an A (address) field 22, C (control) field 24, and FCS (frame check sequence) field 26 to I field 28 consisting of each segment, for example, according to X.25 LAPB (link access protocol balanced), as shown in FIG. 2C. An SAR (segmentation and reassembly) unit 14 divides I frames into segments having a 44 bytes length and assembles SAR-PDU (protocol data unit) having a 48 bytes length by adding header 30 and trailer 32 to the segment as a payload 34, as shown in FIG. 2D. An ATM unit 16 assembles an ATM cell by adding an ATM header 36 having a 5 bytes length to the SAR-PDU as an ATM payload 38, and sends the ATM cell to an ATM network 18.

In a received data flow shown by arrows indicating a direction to the left in FIG. 1, data are transferred according to a process in reverse order of the aforementioned process.

A retransmission control unit 40 at a receiver side examines whether a received I frame includes errors, by using the FCS field. According to the X.25 LAPB, the retransmission control unit 40 at the receiver side sends an RR (receive ready) frame including N(R) (receive sequence number) to the retransmission control unit 40 at a transmitter side when one or more I frames, not including errors, are received, and sends an REJ (reject) frame when an I frame, including an error, is received. The retransmission control unit 40 at the transmitter side retransmits the I frame when the RR frame is not received within a prescribed time or when the REJ frame is received.

As shown in FIG. 1, the data segmentation unit 10, the transmission control unit 12 and the retransmission control unit 40 belong to a data link layer of the OSI reference model, the SAR unit 14 belongs to ATM adaptation layer, and the ATM unit 16 belongs to an ATM layer.

As mentioned previously, if the prescribed length of the I field is small, transmission efficiency is lowered because of a frequent error detection process. On the other hand, if the prescribed length of the I field is large, the transmission efficiency is lowered as the traffic in the ATM network 18 increases.

The preferred embodiments of the present invention will now be described with reference to the accompanying drawings.

Figure 3:
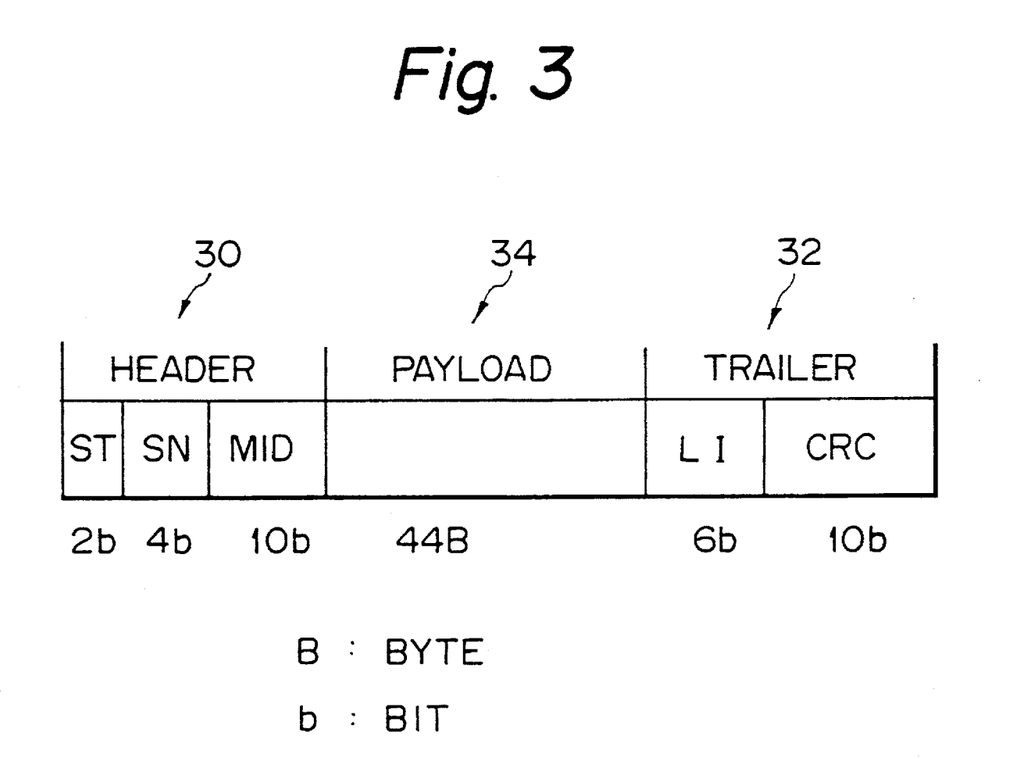
FIG. 3 is a diagram showing a detailed format of the SAR-PDU shown in FIG. 2D.

FIG. 3 shows a detailed format of the SAR-PDU shown in FIG. 2D. The SAR-header 30 includes an ST (segment type) field, an SN (sequence number) field, and an MID (multiplexing identification) field. The SAR-trailer 32 includes an LI (length indicator) field and a CRC (cyclic redundancy check code) field.

Figure 4:
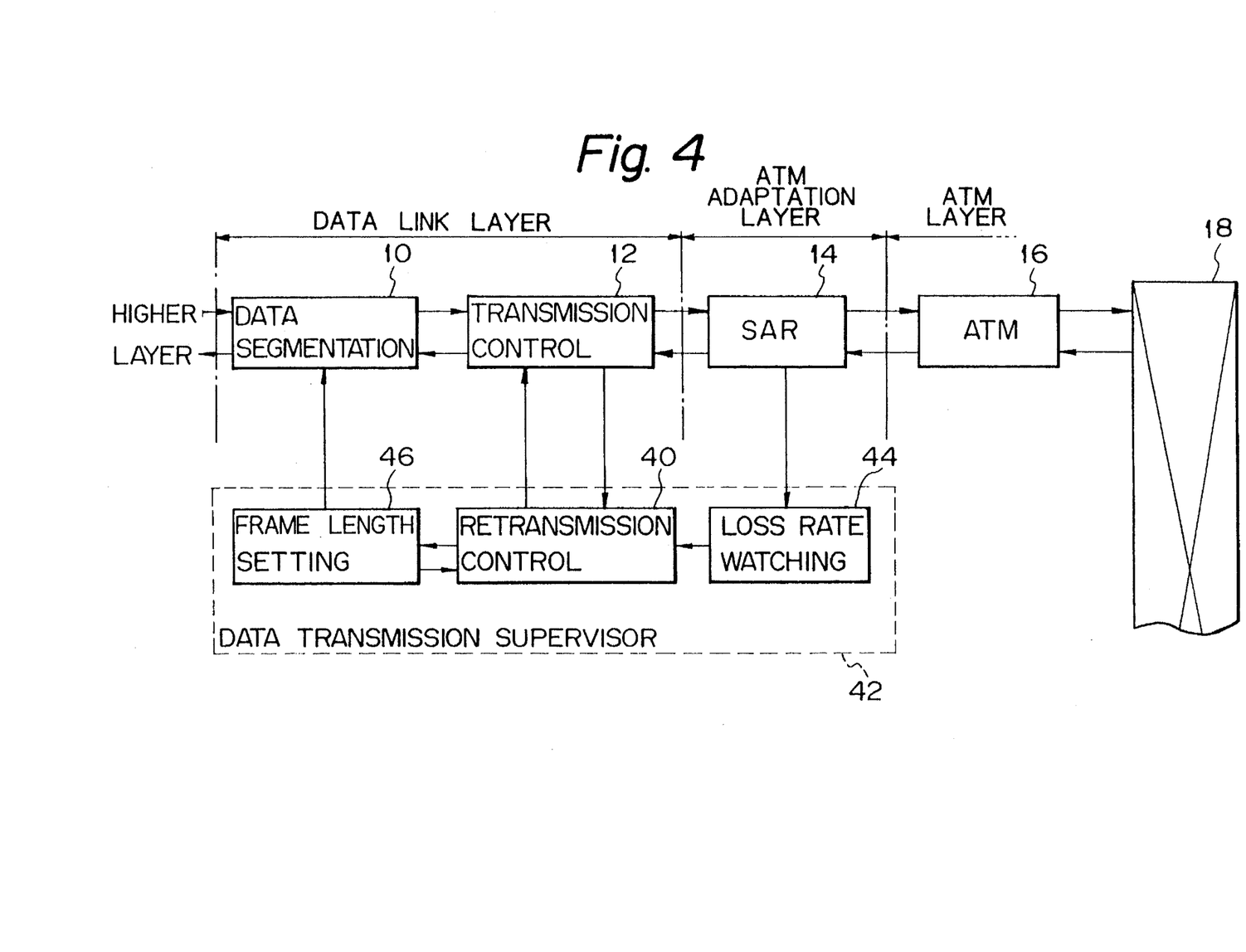
FIG. 4 is a block diagram showing the construction of a transmission system according to an embodiment of the present invention.

FIG. 4 shows the construction of a transmission system according to an embodiment of the present invention. The same reference numerals as used in FIG. 1 are used for constituents that are similar to those in FIG. 1.

A data transmission supervisor 42 consists of the retransmission control unit 40, a loss rate watching unit 44, and a frame length setting unit 46.

The loss rate watching unit 44 at a receiver side calculates the rate of lost cells per unit time, from the number of lost cells or cells including errors among cells received in the SAR unit 14 and the number of received cells not including errors. The number of lost cells is obtained by watching the SN fields of the ATM cells received in the SAR unit 14, and whether the received cells include errors is determined by using the CRC field of the SAR-trailer 32 in the SAR unit 14. The rate of lost cells is fed through the retransmission control unit 40 to the frame length setting unit 46 at the receiver side.

The frame length setting unit 46 determines the optimum length of the I field in accordance with the rate of lost cells. Namely, if the loss rate is smaller, a longer length is selected, and if the loss rate is larger, a shorter length is selected. The frame length setting unit 46 communicates the determined I field length to the data segmentation units 10 of the receiver side and the transmitter side. The communication of the I field length to the transmitter side is carried out through a link between the retransmission control units 40 of the receiver and transmitter sides according to a protocol described later.

The retransmission control unit 40 performs the above process to attain a frame length control as well as the previously mentioned retransmission process.

Figure 5:
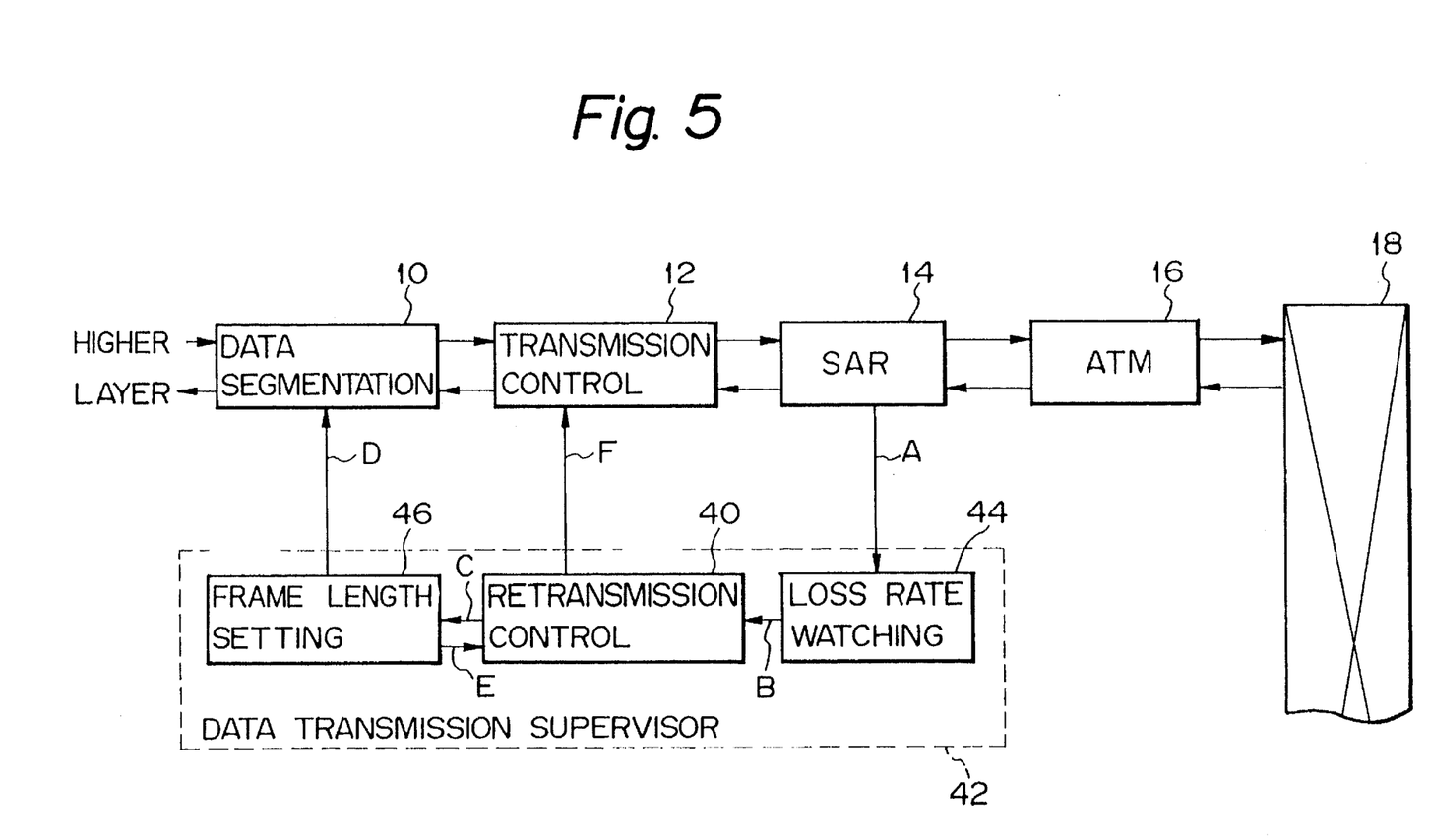
FIG. 5 is a block diagram explaining an operation of the data transmission supervisor shown in FIG. 4 at a receiver side.

An operation of the data transmission supervisor 42 at the receiver side is described referring to FIG. 5. The loss rate watching unit 44 calculates the loss rate as mentioned previously (arrow A), and communicates the loss rate to the retransmission control unit 40 (arrow B). The retransmission control unit 40 communicates the loss rate to the frame length setting unit 46 (arrow C). The frame length setting unit 46 determines the optimum I field length according to the loss rate, and communicates the I field length to the data segmentation unit 10 (arrow D) and to the retransmission control unit 40 (arrow E). The retransmission control unit 40 communicates the I field length through the transmission control unit 12 (arrow F) to a data transmission supervisor 42 at the transmitter side according to a protocol described later.

Figure 6:
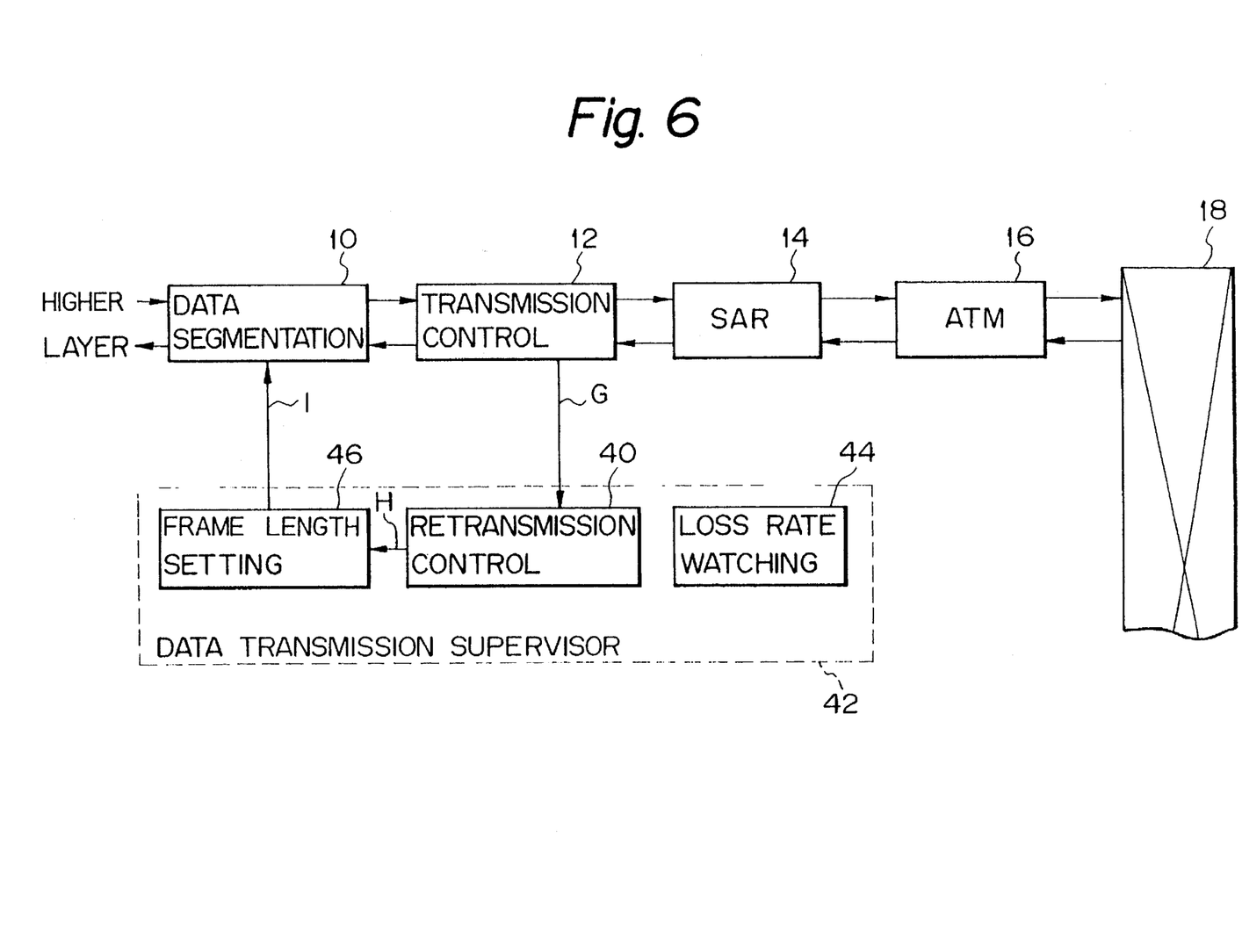
FIG. 6 is a block diagram explaining an operation of the data transmission supervisor at a transmitter side.

An operation of the data transmission supervisor 42 at the transmitter side is described referring to FIG. 6. Upon receiving the I field length from the receiver side (arrow G), the retransmission control unit 40 communicates the I field length to the frame length setting unit 46 (arrow H). The frame length setting unit 46 sets the I field length at the data segmentation unit 10 (arrow I).

Figure 7:
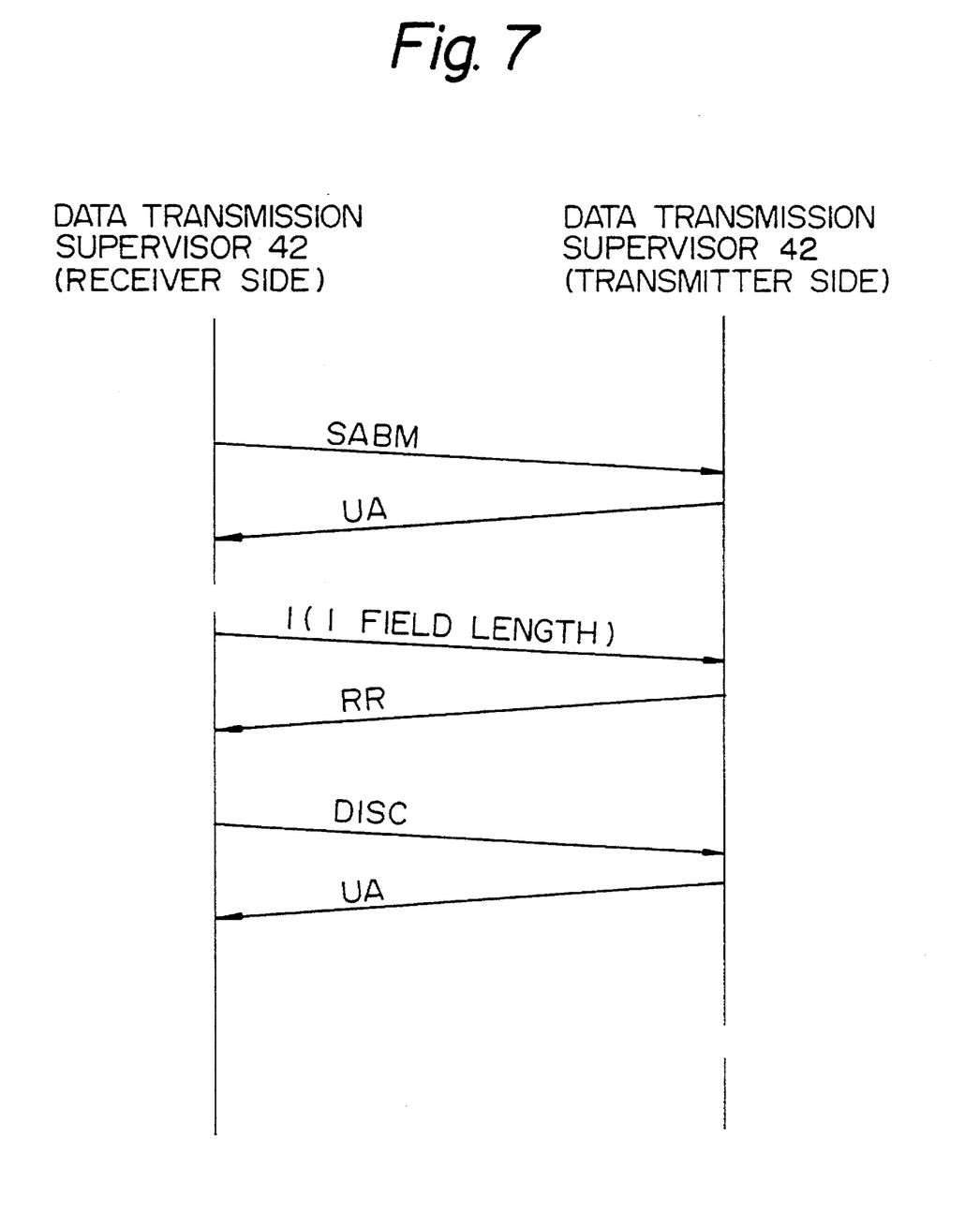
FIG. 7 is a diagram showing a first example of the protocol for communicating the length data from the receiver side to the transmitter side.

FIG. 7 shows a first example of the protocol for communicating the I field length from the data transmission supervisor 42 of the receiver side to that of the transmitter side. The data transmission supervisor at the receiver side sends a SABM (set asynchronous balanced mode) command to the transmitter side in order to establish a data link and communicate the I field length data. If an UA (unnumbered acknowledgement) response is received from the transmitter side, an I frame containing the I field length data is sent to the transmitter side. If an RR (receive ready) response is received, a DISC (disconnect) command is sent to the transmitter side. After an UA response is received, the data link is released.

Figure 8A:
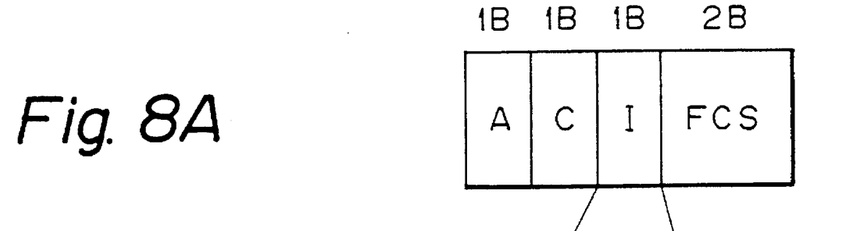
FIG. 8A and 8B are diagrams showing a format of an I frame containing the length data.
Figure 8B:
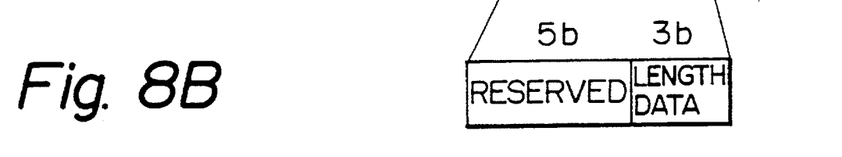
Figure 9:
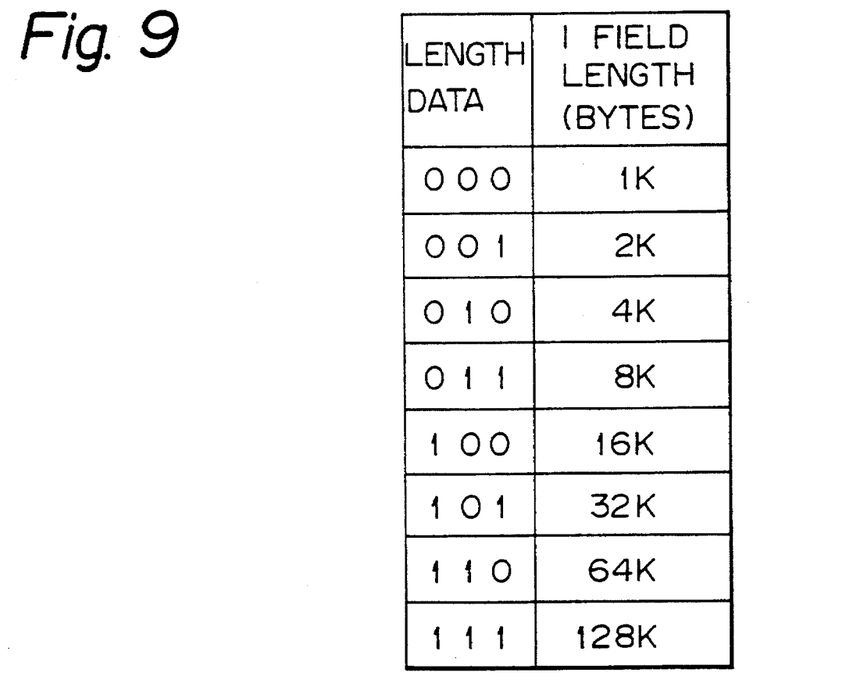
FIG. 9 is a diagram showing correspondence of the length data with the I field length.

FIGS. 8A and 8B show a format of the I frame containing the I field length data. The I frame includes one byte of I field as shown in FIG. 8A. The I field includes a 3 bit length data field as shown in FIG. 8B. The binary code in the length data field corresponds to the length of I field for containing information transmitted from the transmitter side, as shown in FIG. 9.

Figure 10:
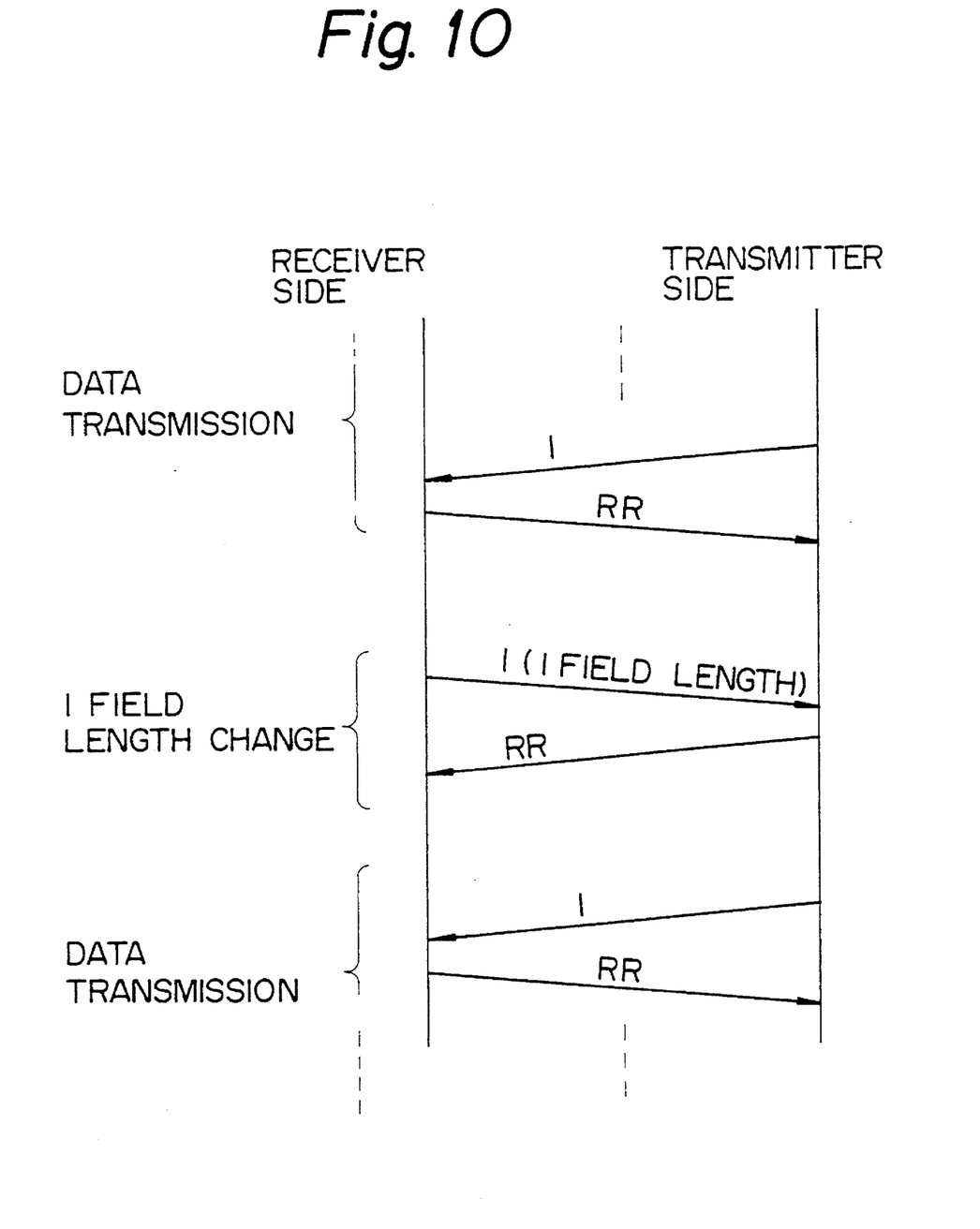
FIG. 10 is a diagram showing a second example of the protocol for communicating the length data from the receiver side to the transmitter side.
Figure 11A:
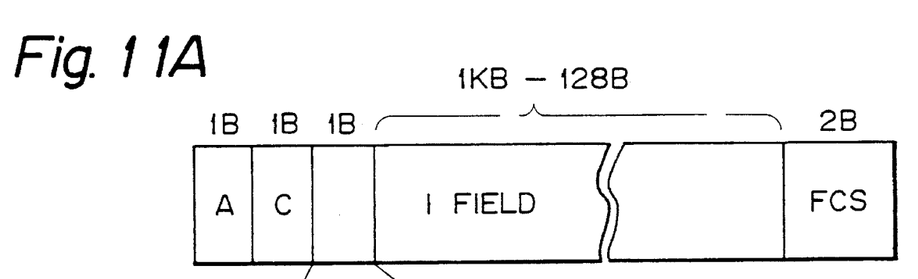
FIGS. 11A and 11B are diagrams showing a format of the I frame in the second protocol.
Figure 11B:
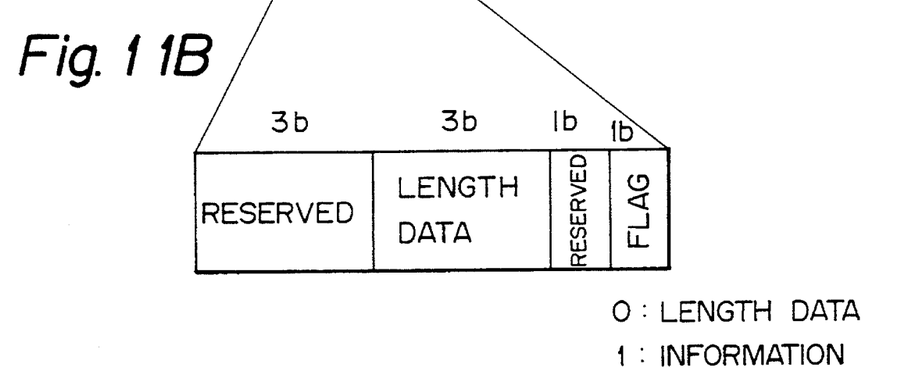

FIG. 10 shows a second example of the protocol for communicating the I field length from the receiver side to the transmitter side. In the protocol shown in FIG. 10., the I field length data is transmitted on a special I frame having the same format as a usual I frame for transmitting usual data in a reverse direction, and a data link for transmitting the field length data only is not required. FIG. 11A and FIG. 11B show a frame format of the I frame in the second protocol. As shown in FIG. 11A, the I frame includes 1 byte information after the C field. The 1 byte information includes a 3 bit length data field and 1 bit flag field, as shown in FIG. 11B. The binary code in the length field represents the length of I field for containing usual information, according to the correspondence of FIG. 9. When the flag field is "1", the I frame includes the usual I field having a 1 kB to 128 kB length. When flag field is "0", the I frame contains length data in the length data field and does not include the usual I field.

We claim:

1. A method of controlling a length of an information frame in a data transmission system, wherein transmitted data are divided into information frames and the information frames are further divided into fixed length data blocks to which routing data are added to form cells in order to be transmitted on a network, comprising the steps of:

(i) detecting the rate of cells lost in the transmission on the network;

(ii) determining the length of the information frame to operatively reduce the rate detected in step (i); and (iii) using the length determined in step (ii) as the length of the information frame.

2. A method as claimed in claim 1, wherein the steps (i) and (iii) are executed in a receiver side and the method further comprises the step of:

(iv) communicating the determined length to a transmitter side.

3. A method as claimed in claim 1, wherein each cell includes a sequence number and the step (i) includes the substeps of:

monitoring the sequence number of each cell, and calculating the rate of lost cells from monitoring the sequence number of each lost cell.

4. An apparatus for controlling a length of an information frame in a data transmission system, wherein transmitted data are divided into information frames and the information frames are further divided into fixed length data blocks to which routing data are added to form cells in order to be transmitted on a network, comprising:

means for detecting a rate of cells lost in the transmission on the network;

means for determining the length of the information frame to operatively reduce the rate detected by the detecting means; and means for using the length determined by the determining means as the length of the information frame.

5. An apparatus as claimed in claim 4, further comprising:

means for communicating the length determined by the determining means at a receiver side to a transmitter side.

6. An apparatus as claimed in claim 4, wherein each cell includes a sequence number and the detecting means comprises:

means for monitoring the sequence number of each cell, and means for calculating the rate of lost cells from monitoring the sequence number of each cell by the monitoring means.

7. A method of controlling a length of an information bit in a data transmission system, wherein transmitted data are divided into information bits and the information bits are further divided into fixed length data blocks to which routing data are added to form cells in order to be transmitted on a network, comprising the steps of:

(i) detecting the rate of cells lost in the transmission on the network;

(ii) controlling the length of the information bits to be shorter or longer in accordance with the rate detected in step (i); and (iii) using the length determined in step (ii) as the length of the information bit.

8. An apparatus for controlling a length of an information bit in a data transmission system, wherein transmitted data are divided into information bits and the information bits are further divided into fixed length data blocks to which routing data are added to form cells in order to be transmitted on a network, comprising;

means for detecting a rate of cells lost in the transmission on the network;

means for controlling the length of the information bits to be shorter or longer in accordance with the rate detected by the detecting means; and means for using the length determined by the determining means as the length of the information bit.

* * * * *